US007024691B1

(12) United States Patent
Herzberg et al.

(10) Patent No.: US 7,024,691 B1
(45) Date of Patent: Apr. 4, 2006

(54) USER POLICY FOR TRUSTING WEB SITES

(75) Inventors: Amir Herzberg, Ramat Efal (IL); Yosi Mass, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 09/688,687

(22) Filed: Oct. 17, 2000

(51) Int. Cl.
*H04L 9/32* (2006.01)

(52) U.S. Cl. ............................................ 726/5; 726/27
(58) Field of Classification Search ........ 713/154–156, 713/200–1, 164, 175, 168–170; 705/67, 705/44, 53, 57, 76; 380/229, 234; 707/2, 707/3, 5, 9, 1, 10; 345/619, 650, 714, 743, 345/744, 763–764, 864; 726/1–6, 11–14, 726/17, 19, 21, 27–30; 709/100, 202, 203, 709/229, 223–225
See application file for complete search history.

(56) References Cited

U.S. PATENT DOCUMENTS

| 5,794,207 A | * | 8/1998 | Walker et al. ................. 705/1 |
| 5,948,103 A | * | 9/1999 | Fukuzaki .................... 713/200 |
| 6,018,724 A | * | 1/2000 | Arent .......................... 705/44 |
| 6,091,835 A | * | 7/2000 | Smithies et al. ............ 382/115 |
| 6,286,001 B1 | * | 9/2001 | Walker et al. ................. 707/9 |
| 6,308,273 B1 | * | 10/2001 | Goertzel et al. ............... 726/9 |
| 6,405,177 B1 | * | 6/2002 | DiMattina .................... 705/26 |
| 6,438,690 B1 | * | 8/2002 | Patel et al. ................. 713/156 |
| 6,587,837 B1 | * | 7/2003 | Spagna et al. ............... 705/26 |
| 6,587,867 B1 | * | 7/2003 | Miller et al. ................. 709/200 |
| 6,658,394 B1 | * | 12/2003 | Khaishgi et al. .............. 705/58 |

OTHER PUBLICATIONS

PR Newswire: Versigns Signs Agreement With Network Solutions to Identify Secure Websites Within New Global Directory of Online Businesses; Apr. 19, 1999; PR Newswire, New York; 3 pages.*
Business Editors/Health & High-Tech Writers: Intel Launches Internet Services Business to Enable Trusted e-Health Transactions; AMA and Intel Team to Deliver Online Creasentials to Physians; Oct. 12, 1999; Business Wire, New York; 3 pages.*

(Continued)

*Primary Examiner*—Kim Vu
*Assistant Examiner*—Leynna Ha
(74) *Attorney, Agent, or Firm*—Browdy and Neimark, PLLC (57) ABSTRACT

A system for trusting sites in a communication network, the communication network including a plurality of user nodes inter-linked through a proxy node to a site server. The system includes the proxy that is associated with an advanced policy being responsive to input certificates for verifying one or more declarations. Each one of the declarations is associated with a symbol. A user accessing from a user node, through a proxy node to a server site. The proxy node authenticating the site and then the server site providing to the proxy node, through said communication network, one or more credentials that refer to the site. The proxy node testing the credentials against the advanced policy in order to verify the declarations and displaying in respect of each verified declaration the corresponding symbol.

20 Claims, 4 Drawing Sheets

OTHER PUBLICATIONS

PR Newswire: Versigns and Mind Spring Sign Agreement to Deliver Secure E-Commerce for Small and Mid-Sinzed Businesses; Aug. 30, 1999; PR Newswire, New York; 3 pages.*

Marlin, Steve: Wells Fargo eyes 'trusted agent' role; Aug. 1999; Bank Systems & Technology, New York; vol. 36, Iss.8 p. 36.*

* cited by examiner

USER POLICY FOR TRUSTING WEB SITES

FIELD OF THE INVENTION

This invention relates to trusting web sites.

BACKGROUND OF THE INVENTION

With the ever-increasing popularity of the Internet, there is an obvious need to provide tools to a user browsing site to decide if sites are trusted. An example is the access control of children to sites having sex or violent contents, or by another example to enter, in a trusted manner, credit card number in electronic purchase transactions over the Web.

Figure 1:
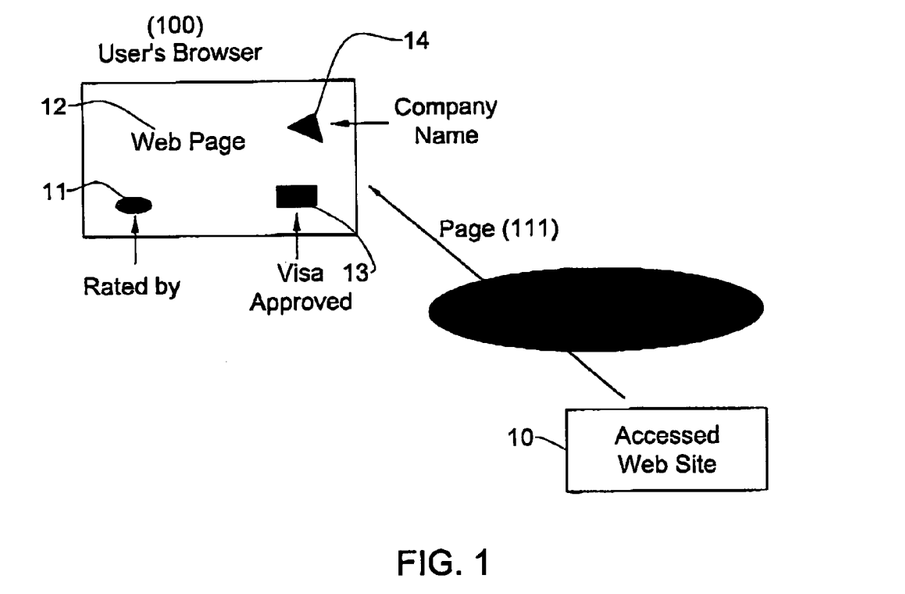
FIG. 1 is a generalized schematic illustration of a trusting site scenario according to the prior art.

One possible approach of addressing this problem is to present symbols indicative of site's is sex or violence degree. For example, consider the scenario of FIG. 1 where a site (10) presents on its Web page (11) a symbol (12) declaring that it is rated by RSAC (Recreational Software Advisory Council) or presents a symbol indicative of, say, IBM logo (14) or Visa approved (15). How can the user know that the site is not cheating? In other words how can the user trust that what the site declares (by means of the specified symbol) is indeed true?

There are various hitherto solutions that purport to address the problem of trusting sites.

For example, PICS (Platform for Internet Content Selection) is a format to rate web pages in some categories (sex, violence etc.) and associated mechanism supported by some browsers to limit access to web sites by constraints on the rated values. Thus, for example, web sites having a sex rate level that is greater than 3 cannot be accessed. It is noted that the proposed approach does not present a symbol indicative of the trust level of the site, but rather defines a "policy" in order to determine whether or not to approve access to the site.

The latter solution has some inherent disadvantages including the fact that the list of categories (e.g. sex, violence) is pre-defined and a site cannot provide another category which the site owner considers appropriate. Moreover, only rudimentary policy that is used in order to authorize or not the access is allowed (e.g. admittance is allowed only if the site rank is greater or equals to a given value).

Another possible approach is to present a pre-defined symbol attesting that the site is indeed trusted in respect of what it claims. This solution is realized in a specific case of site that claims to be secured such that the user can safely transmit personal details including his/her credit card number. In the case of Netscape™ browser, the specified symbol is a "broken key" which is rendered "complete" in the case that the site under question is indeed secured.

In practice, the specified mechanism is accomplished by utilizing the known Secured Electronic Transaction (SSL) protocol, in which a site provides certificate (the subject of which being, say the site's URL signed by a Certificate Authority (CA, referred to, occasionally, also as Certificate Issuer—CI) that is specified by the user (in the user station) as an acceptable CA. If such a certificate is provided, the specified key is rendered complete. In other words, the user specifies at the user's node a list of authorized CA's (user's CA list) and if a site under question provides a certificate signed by a CA in the list, this attests that the site is sufficiently secured from the stand point of the user and a visual indication in the form of "complete key" is displayed at a pre-defined area on the screen. The protocol supports also designation of a certificate chain. Thus, a site is considered secured if it can provide a certificate signed by a CA which is a member in a certificate chain whose root CA is included in the specified user's CA list.

The latter approach is associated with some inherent limitations, including (i) the proposed scheme applies only to a single predefined unconfigurable symbol having a given meaning (i.e. a symbol of a key which is rendered complete to indicate that the specified site is "secured"); (ii) only rudimentary "policy" is supported, i.e. a CA or root CA must be included in the specified list; and (iii) the specified rudimentary policy is associated only with the user node.

SUMMARY OF THE INVENTION

There is accordingly a need in the art to provide for a system and method that substantially reduces or eliminates the drawbacks of hitherto known solutions.

There is a need in the art to provide for a system and method, which enables to support more advanced policies and not only the specified rudimentary policies. The term more advanced policies will be described and clarified in greater detail below.

Still further, there is a need in the art to provide for a system and method which enables to configure according to a specified need a symbol (or symbols) indicative of a given declaration (or declarations) that the site claims to be true. If the specified symbol or symbols are displayed at a trusted pane (normally at pre-defined locations) on the user screen, this attests that declaration(s) that correspond to the specified symbol(s) is (are) verified. For example, if it is desired to indicate that a site is "Visa Approved", i.e. that the site has been approved by Visa such that any transaction with the Visa™ credit card will benefit from X % discount, it would be possible to design such a symbol, which when appears on the trusted pane on the user screen, he/she can be sure that the specified site is trusted to be Visa Approved.

Still further, there is a need in the art to provide for a system and method which enables to define the policy (whether rudimentary or advanced) that is associated not only with the user station but, alternatively, elsewhere, and more specifically in association with, the proxy node that is communicating with the user node.

Whilst for convenience of explanation the invention is described with reference to certificates that constitute one example credential, the invention is likewise applicable to other types of credentials including, but not limited to signed XML document, data retrieved securely from authenticated repositories.

It should be noted that the user, through user node, communicates with the site node (referred to occasionally also as server node) through communication network. In the context of the invention, whenever the term proxy (or proxy node) is used, it should be construed as any node or nodes residing in the communication network such that the user node communicates through said proxy node to the site node. The user node, the proxy node and the site node can be realized in any known per se manner, including the non limiting example where the user node and the proxy node are implemented in the same machine (e.g., in the same Personal Computer).

The invention provides for a method for trusting sites in a communication network, comprising:

(a) providing a policy being responsive to input credentials for verifying at least two declarations; each one of said at least two declarations is associated with at least one symbol;

(b) a user accessing a site through a communication network;

(c) providing through said communication network a credential indicative of at least two declarations about the site;

(d) authenticating the site and testing said credential against the policy in order to verify said at least two declarations and displaying in respect of each verified declaration the corresponding at least one symbol.

The invention further provides for a method for trusting sites in a communication network, comprising:
  (a) providing an advanced policy being responsive to input credentials for verifying at least one declaration; each one of said at least one declaration is associated with at least one symbol;
  (b) a user accessing a site through a communication network;
  (c) authenticating the site;
  (d) providing through said communication network at least one credential indicative of at least one declaration about the site;
  (e) testing said at least one credential against the advanced policy in order to verify at least one declaration from among said at least one declaration and displaying in respect of each verified declaration the corresponding at least one symbol.

Still further, the invention provides for a system for trusting sites in a communication network, the communication network including a plurality of user nodes inter-linked through at least one proxy node to at least one site server, the system comprising:
  the proxy is associated with a policy being responsive to input certificates for verifying at least two declarations; each of said at least one declaration is associated with at least one symbol;
  a user accessing from a user node, through a proxy node to a server site;
  the server site providing to said proxy node, through said communication network, a credential indicative of at least two declarations about the site;
  the proxy node authenticating the site and testing said credential against the policy in order to verify said at least two declarations and displaying in respect of each verified declaration the corresponding at least one symbol.

Yet further, the invention provides for a system for trusting sites in a communication network, the communication network including a plurality of user nodes inter-linked through at least one proxy node to at least one site server, the system comprising:
  the proxy is associated with an advanced policy being responsive to input certificates for verifying at least one declaration; each one of said at least one declaration is associated with at least one symbol;
  a user accessing from a user node, through a proxy node to a server site;
  the proxy node authenticating the site;
  the server site providing to said proxy node, through said communication network, at least one credential indicative of at least one declaration about the site;
  the proxy node testing said at least one credential against the advanced policy in order to verify said at least one declarations and displaying in respect of each verified declaration the corresponding at least one symbol.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 2:
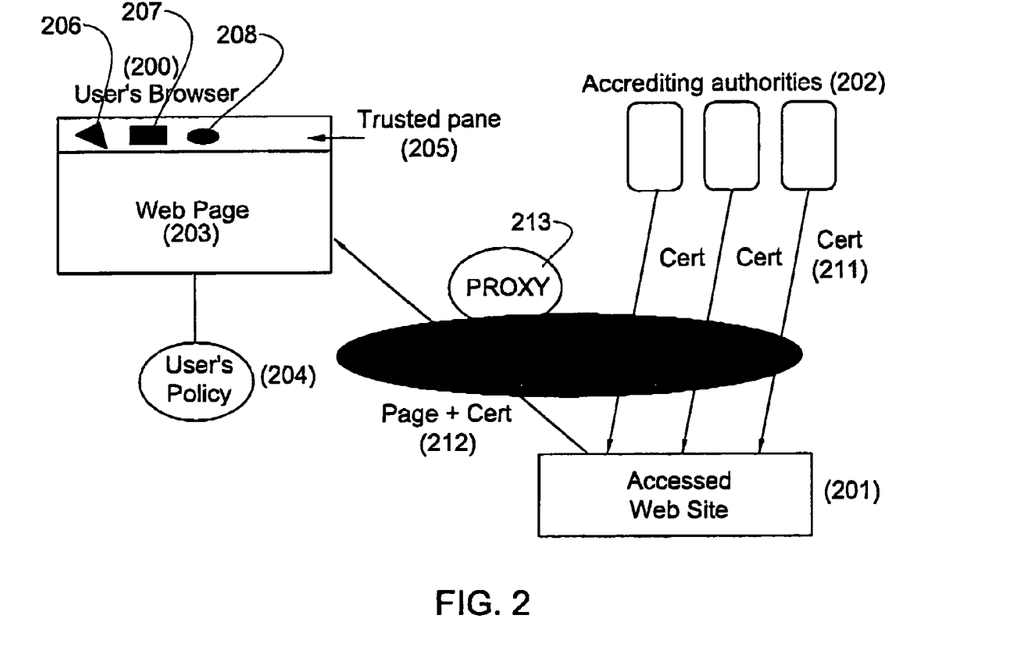
FIG. 2 is a generalized schematic illustration of a trusting site system according to a preferred embodiment of the invention.

Turning now to FIG. 2, there is shown a generalized schematic illustration of a trusting site system according to a preferred embodiment of the invention.

For convenience of explanation the description below focuses on internet based applications where the user node is running a browser. Those versed in the art will readily appreciate that the invention is, by no means, bound by this particular embodiment. Thus, by way of non-limiting example, in accordance with a modified embodiment the invention is applicable to Intranet applications; in accordance with another modified embodiment, instead of a browser that is incorporated in a user node a cellular telephone is used and by yet another modified embodiment a Personal Digital Assistance is used.

Reverting to FIG. 2, there is shown a generalized schematic illustration of a system for trusting sites according to a preferred embodiment of the invention. By this embodiment the user defines a policy (204). There is further defined a trusted pane (205) (that is not controlled by site for which authorization is sought) in which the symbol(s) that correspond to the trusted declaration are displayed. The specified pane is combined with another pane where the original Web page (203) is displayed. If a given symbol appears in the trusted pane (e.g. a company name, say IBM, indicated schematically in FIG. 2 as triangle 206) the user can be sure that indeed the so displayed original page (in the other pane) originated from the specified company. In order to display the trusted symbols, the accessed web site (201) provides the web page that will be displayed along with the certificates which may either be at the site's disposal or which may alternatively be collected from other sources from remote certificate repository (e.g. certificates (211) collected from accrediting authorities (202)). The page and the certificates (212) are fed through proxy node (213) to the user node and the certificates are fed as an input to a policy module (204). By this particular example the policy module tests whether what the site declares to be, (i.e. a genuine IBM site), is indeed true and if in the affirmative the policy module would allow to display the symbol of IBM (206) on the trusted pane (205). Whereas in the example above the site is the one who "claims" (referred to also as "declares") about itself and provides the pertinent certificates, this is not necessarily always the case. Thus, in accordance with a modified embodiment the claim about the site is not originated by the site itself (e.g. the claim is originated by the user or the proxy and the claim will be verified using the policy) and accordingly the pertinent certificate(s) are collected by the policy.

It is noted herein that the site for which authorization is sought has no control on the trusted pane. There follows herein an exemplary code which illustrate one possible variant how to realize the trusted pane.

```
<html>
    <head>
        <title>IBM TrustPane - Establish Trust With Web Sites</title>
            <script language="JavaScript">
            <!--
                function getPane() {
                trustPane.location.href="http://_trustPane/getPane?${serverName}";
                }
            // -->
            </script>
    </head>
    <frameset rows="150, *" onLoad="getPane() ">
        <frame name=trustPane>
        <frame src=${requestedUrl}>
    </frameset>
</html>
``` where:
The function getPane( ) calls the proxy to build the trustedPane
${serverName} is replaced by the web site address to check
${requested Url} is replaced by the original requested URL.
1216258/00013_let.doc As shown, the proxy builds a page that consists on two distinct panes, the first (designated in the above example trustPane) is the trusted pane generated by the proxy (and in which the specified symbols will be displayed) and the second (designated in the above example requestedUrl) is the original page of the site. If desired, the two pane structure is maintained also in other pages that are displayed. Those versed in the art will readily appreciate that the two pane structure is only an example and the invention is not bound thereby and a fortiori not by the specific realization thereof.

By one embodiment the policy is capable of testing two or more declarations and in respect of each one of them to display an appropriate symbol (in the case that the corresponding declaration is verified). As shown in FIG. 2, two additional symbols (207) and (208) are displayed (in the trusted pane) standing for "visa approve" and rated by "RSAC" declarations, respectively. The specified symbols are displayed for illustrative purposes in the form of rectangular and elliptic shapes. Whilst in the system of FIG. 2 the user policy (204) is associated with the user node (200) this is not necessarily always the case and by another preferred embodiment the specified policy module is associated e.g. with the proxy node (213).

Figure 3:
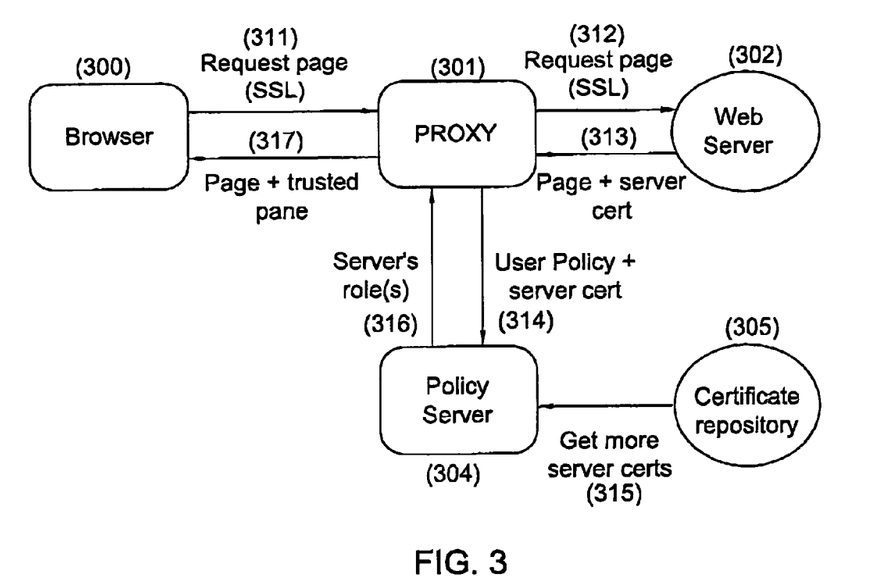
FIG. 3 is a generalized flow chart that corresponds to the trusting site system of FIG. 2.

Turning now to FIG. 3, there is shown a generalized flow chart that corresponds to the trusting site system of FIG. 2 in accordance with one embodiment of the invention. As shown, browser (300) of the user node communicates with the proxy node (301) which, in turn, communicates with the so accessed web site (web server (302)). The proxy further communicates with policy server (304) which is capable of communicating with a certificate repository (305).

In operation, the user requests a web page (311) and apply preliminary authentication sequence using e.g. the known per se SSL protocol. The request is captured by proxy node (301) which forwards it (312) to the web server (302). The web server supplies a site certificate during the SSL server authentication phase (313).

Having received the certificate and the page to be displayed, the proxy (301) forwards the certificate to the policy server which tests the certificate by retrieving the identity of the subject (e.g. public key of the site) and tests the claims of the ID against the policy (and if needed collects more certificates from certificate repository 305) and verify what the site declares to be true. To this end, the policy server (304) employs a user policy, which may be pre-stored in the server, or alternatively fed as an input (314) (as is the case in the specific embodiment depicted in FIG. 3). Should the server require more certificates it would address certificates repository (305), e.g. according to a pre-defined configuration or the address indicated in the certificate that was provided by the web server during the SSL authentication phase.

By the specific example of FIG. 3, the policy server includes role assignment module associated with role policy such that subjects (the subject signifies by this embodiment the site's identity are mapped to roles, according to the role policy, and the roles correspond to the declaration(s) of the site.

Reverting now to FIG. 3, the server policy maps the subject (i.e. the site identity (302)) to a role or roles according to the policy and, if required, collects (315) more certificates from the certificate repository (305). The so mapped roles are delivered (316) from the policy server (304) as an input to the proxy (301) which then builds the trusted pane and sends it (317) along with the page to the browser (300). In the specific example under consideration, the roles (316) corresponds to the following verified declarations: 1) the site is a genuine IBM site, 2) the site is Visa approved; and 3) the site is rated by RSAC. Accordingly, the trusted pane will include the three symbols that correspond to these verified declarations. Those versed in the art will readily appreciate that the architecture of FIG. 3 is only optional and other variants may apply, all as required and appropriate.

Figure 4:
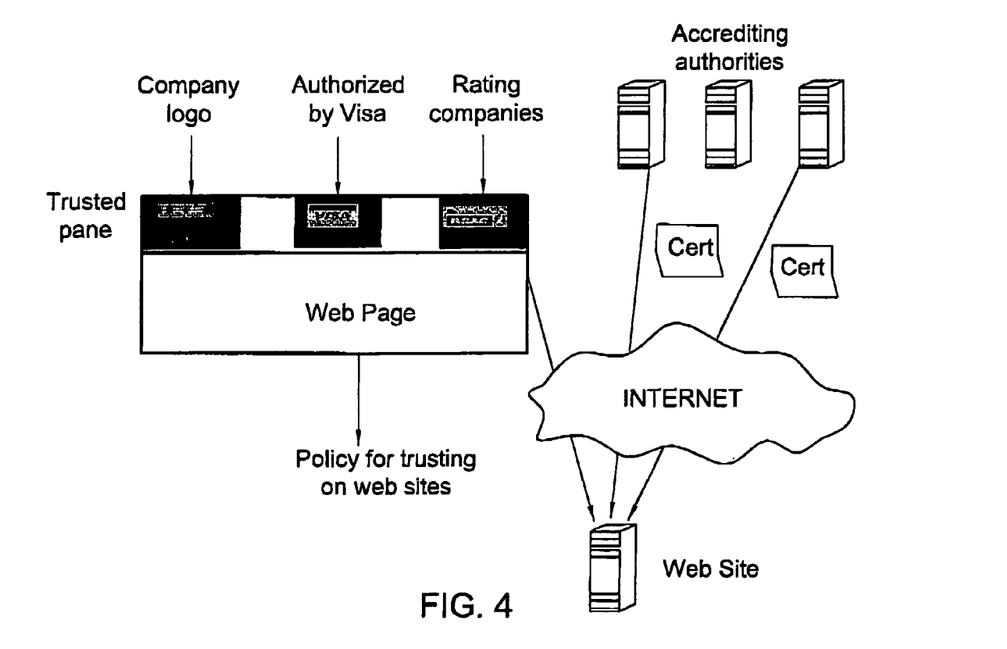
FIG. 4 illustrates an exemplary web page portrayed on the user node screen with symbols indicating trusted declarations of a given site in accordance with the trusting web sites technique of the invention.

The resulting web page with the trusted pane that includes the specified symbols is illustrated for example in FIG. 4 where the IBM symbol (401), Visa symbol (402) and RSAC symbols (403) in the trusted pane (404) of web page (405). In the embodiment described in reference to FIG. 3 the SSL protocol was utilized and a rudimentary policy was employed based on (i) a single certificate that is provided by the web server or (ii) a certificate chain provided by the site (and/or by others, which the case may be). In other words, a certificate that normally does not qualify to map a subject to a given role will nevertheless enable to map the subject to the specified role if said certificate belongs to a certificate chain whose root certificate qualifies for mapping the subject to the specified role. The single certificate (if verified) can give rise to two declaration or more. It goes without saying that if only once certificate is used (which is the case of rudimentary policy), the step of collecting other certificates (using repository 305) is not applicable. As will be explained in greater detail below, the certificate collection step is sometimes required in the case that an advanced policy is employed. By a preferred embodiment the repertoire of declarations can be increased to support any declaration that a site wishes to claim about itself. By this embodiment appropriate symbol can be designed to any one of the specified declarations and displayed in the case that the respective declaration is verified.

In accordance with another preferred embodiment of the invention an advanced policy is utilized. The advanced policy employs a role assignment module as disclosed in co-pending application # U.S. Ser. No. 09/298,991 filed on Apr. 26, 1999 assigned to Applicants which is incorporated herein by reference.

Figure 5:
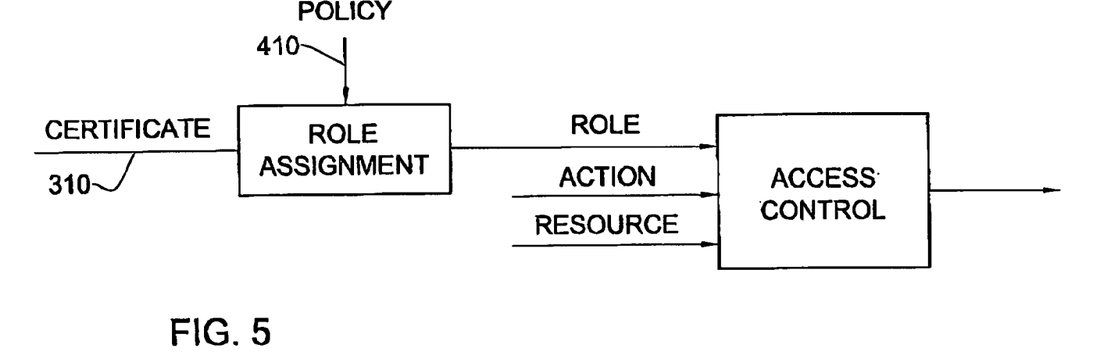
FIGS. 5–6 illustrate schematically an advanced policy utilized in accordance with one embodiment of the invention.
Figure 6:
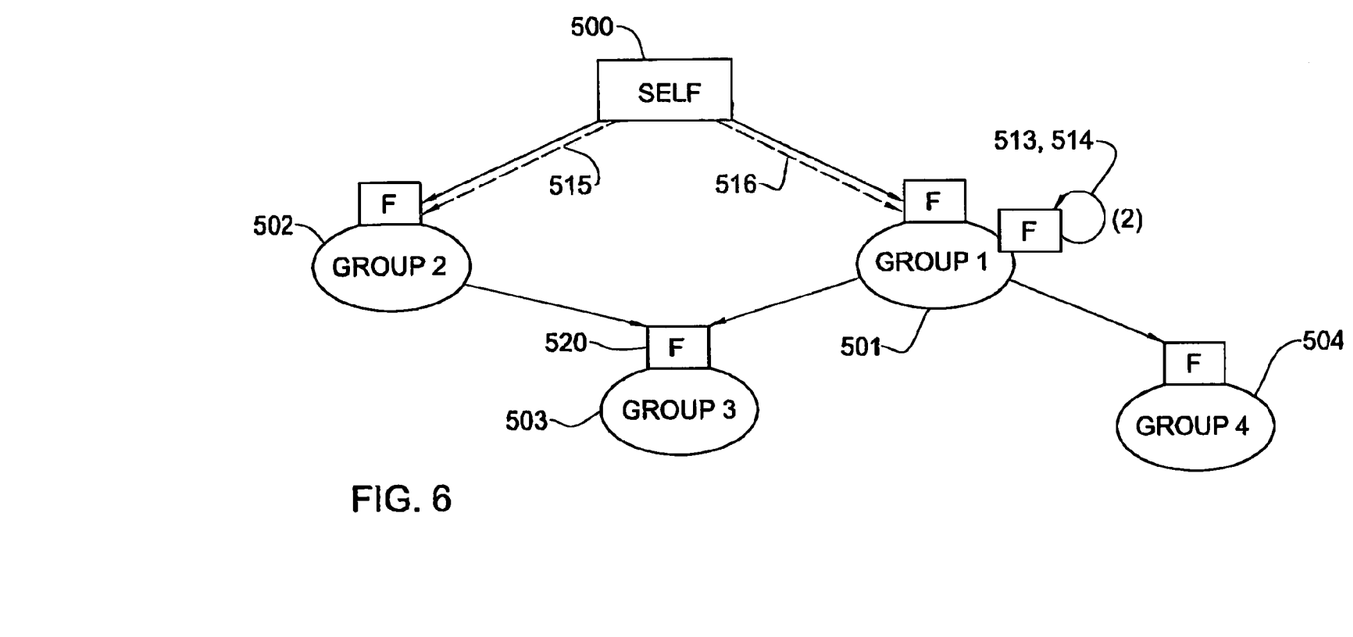

An exemplary embodiments of the specified advanced policy are depicted in FIGS. 5 and 6 that correspond to FIGS. 5 and 6 respectively of the specified '991 application.

In the description below with reference to FIG. 5 the terms role and group are used interchangeably.

In accordance with this embodiment (with reference to FIG. 5), there is provided a general-purpose policy (410) that is defined by a role policy language. The role policy language is a flexible tool using role assignment primitives that are especially adapted for definition of role assignment policies. By using this language, role assignment policy may be defined for a desired application in a relatively simple manner without undue excessive programming effort, as would be the case, had a conventional programming language such as prolog been used.

The so defined policy may be fed to a system of the kind depicted in FIG. 5, and would govern the operation of the role assignment module.

Now, should a new (or an amended) policy be required, it is defined using the specified language and the so modified (or new) policy is fed to the role assignment module. The use of a language of the kind specified is advantageous, however not obligatory.

A typical, yet not exclusive, example of using a role assignment module in accordance with the advanced policy is illustrated in FIG. 6. As shown, each role is represented as a group (501 to 504).

As is known per se, the policy is operated only upon the authorization of a policy owner, who is normally the entity who provides access to the requested resource and in accordance with this invention the specified entity is the proxy. The policy owner holds a key which enables to operate the policy (by the specific embodiment of FIG. 6, the "self" block 500 represents the key of the policy owner). If desired, the policy owner may have additional privileges as will be explained in greater detail below.

According to the policy of FIG. 6, each group has one or more rules on how to map subject or issuer of certificate to a role. A rule defines a certificate or certificates that are subject to operators and possibly function(s) on the attribute(s) of the certificate(s). A function may be NULL in which no constraint is posed on the certificate (or certificates) attributes. Attribute, in this context, is a statement about the subject in the certificate which statement is signed by the issuer of the certificate.

For example, group 3 (503) has a rule which stipulates that a subject X can be mapped to the group if there exists a certificate (511) where X is the subject and whose issuer is in group 2 (502), and there exists a certificate (512) were X is the subject and whose issuer is in group 1 (501) such that the function F (520) holds. The function itself is expressed as constraints on the attributes in the certificates (511) and (512). By this particular example, the rule applies boolean AND operator to the certificates (511) and (512).

The advanced role policy in accordance with this embodiment of the invention does not assume any knowledge about the issuers of the certificates, but only that they should belong to some group (or groups) in the policy. Thus, in order to map a subject to group (503), certificates 512 and 513 should exist, provided that the issuers belong to group 2 and group 3.

There follows now a brief description on how to map an issuer to a role in accordance with an embodiment of advanced policy utilization. As is well known, typically (although not necessarily), an issuer issues a certificate by signing the certificate contents using his private key. Considering that the issuer's public key can be obtained from some public database, the identification of the issuer can be easily determined. Thus, by the specified embodiment, in order to map an issuer to a role, it is only required to check whether the public key thereof belongs to the specified role without requiring any further knowledge on the issuer and in particular avoiding the standard dependent DN testing. Those versed in the art will readily appreciate that the public key unique identifier is only an example, and by alternative embodiments other unique identifier(s) may be employed.

Reverting now to the example of FIG. 6, if, for example, the policy can't reach a decision about X in group 3 (503) because, say, there exist certificates (511) and (512) that satisfy function (520), but the issuer Y of say, certificate (511) is not known to be in group 2 (502) (i.e. the public key thereof is not known to belong to group 2), then the policy tries to map Y to group 2, and if succeeds, then it can map X to group 3 (503). Y, in its turn, can be mapped to group 2 if it meets the rules that allow mapping a subject to a role, i.e. if Y can provide certificates (where Y is the subject of the certificates) that meet the provisions of the specified rules (for becoming a member in group 2). Seeing that Y's public key (standing for Y's unique identifier) is not known in group 2, the lists of certificates that facilitate the mapping of Y into group 2 are rendered Y's unique identifier.

In order to provide the required certificates, a certificate collector may be used to collect missing certificates from remote repositories.

The dynamic nature of the advanced policy in accordance with this embodiment is illustrated, for example, in a rule, which stipulates that a new issuer X can enter group 1 (501), if he is the subject of two certificates (513 and 514), whose respective issuers already belong to a group 1.

The primitives of the policy language include by one embodiment, operators that one applied to one or more certificates and optionally functions applied to attributes of the certificates. Thus, the boolean AND/OR operators are applied to one or more certificates, and the operators exist or not exist are applied to one certificate. Functions are applied to attributes of certificates, and are selected from the group that includes: boolean AND, boolean OR (applied to two or more attributes) boolean NOT (applied to one attribute), greater than, equal, not equal, lower than, etc. Those versed in the art will readily appreciate that the specified primitives are only illustrated by way of example, and effectively any operations applied to certificates and or attributes are applicable. By utilizing the specified policy, a negative (NOT) rule may stipulate that X can be mapped to a group if there does not exist a certificate such that a given function F is satisfied. More specifically, in FIG. 5, a rule may prescribe for example that X will enter to group 3 (503) if there does not exist a certificate (511). Insofar as negative certificate is concerned, considering that it is difficult to prove that there does not exist a certificate, a possible practical solution would consider checking only the certificates that are stored in the local database of the role policy, whilst avoiding excessive processing in attempting to collect more certificates from other sources in order to prove the negative rule. By the particular example of FIG. 6, this would require checking only the certificates stored locally and accessible to the role assignment module.

It should be noted that the term "subject" or issuer should be construed in a broad manner as encompassing amongst the other: individual user, a computer, an application, and organization etc.

Figure 7:
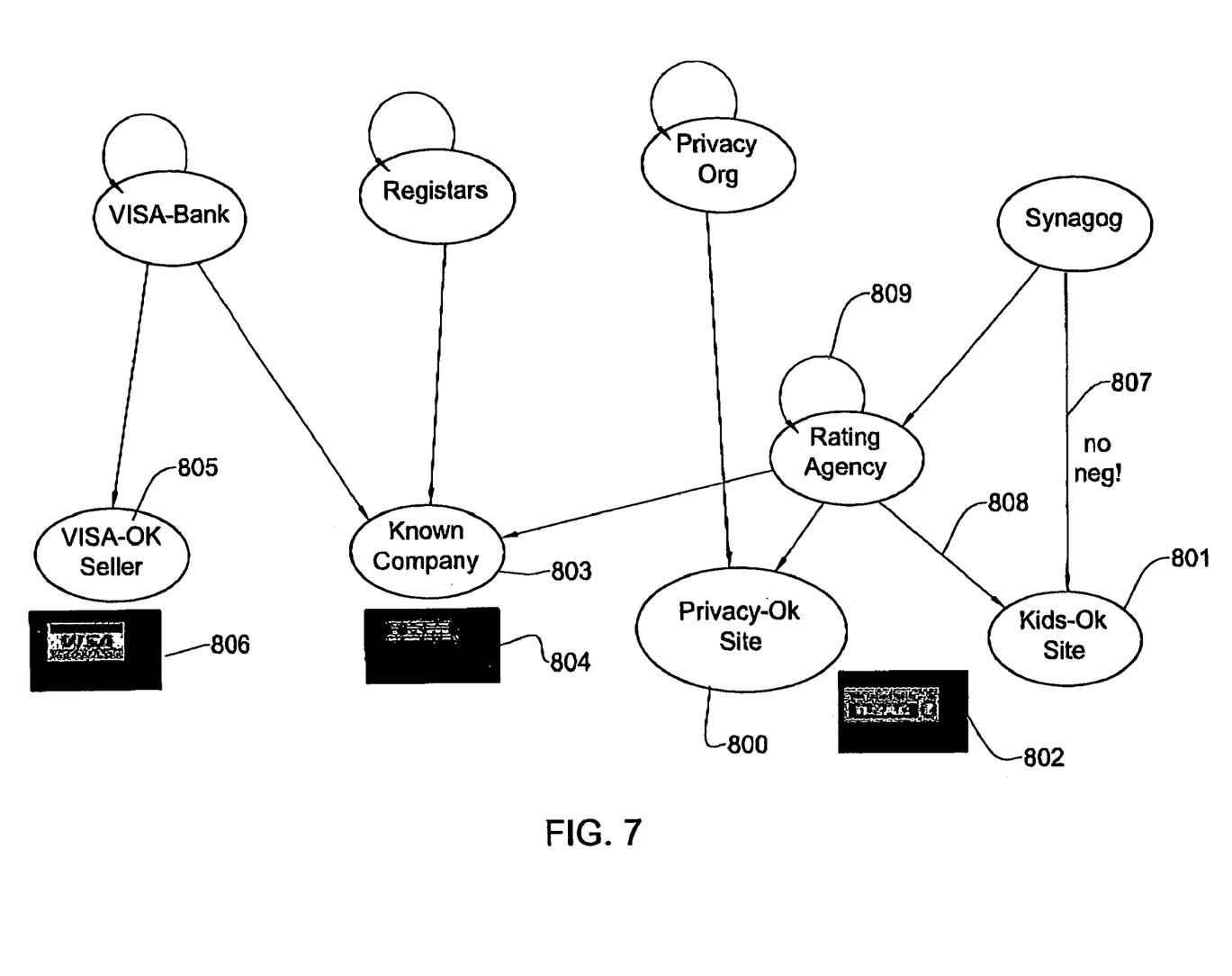
FIG. 7 illustrates schematically an exemplary application that utilizes an advanced policy in accordance with one embodiment of the invention.

A more specific example is given with reference to FIG. 7 illustrating schematically an exemplary application that utilizes an advanced policy in accordance with one embodiment of the invention. As shown, if subject is mapped to Privacy-OK site (800) or to Kids-OK site (801) roles the symbol of RSAC (802) will be displayed in the trusted pane, and, likewise, if the subject is mapped to the Known Company role (803) the IBM symbol (804) is displayed in the trusted pane and, by the same token, mapping to Visa-OK Seller role (805) will lead to the display of the Visa symbol (806). The advanced nature of the policy is illustrated, for example, in connection with the Kids-OK site (801) role. Thus, if a subject (site) is not directly mapped to the Kids-OK site (801) role, then the specified subject can nevertheless be mapped to the specified role if the specified subject is in a certificate signed by an issuer that, in turn, is mapped to the Rating Agency role (807) (such certificate is provided by means of link 808), and provided that there is no negative certificate from the synagogue.

Link (809) further illustrates the advanced nature of the specified policy. Thus, if a subject of a certificate is not directly mapped to the Rating Agency role (807) it can nevertheless be mapped to the specified role if this subject is signed by an issuer that in turn is mapped to the specified role (807).

In the latter example known symbols are utilized (Visa, IBM etc.). If desired the symbols may not necessarily have a known form and accordingly one or more of them is configured to a desired form (e.g. by the proxy) to correspond to a given declaration or declarations.

Utilization of the specified advanced policy may be applied not only to a repertoire of two or more declarations as described with reference to the previous embodiments, but also to a more degenerated form, e.g. a pre-defined and unconfigurable symbol form (such as the hitherto known key symbol) being indicative of a pre-defined declaration (i.e. complete key signifying "secured site").

Those versed in the art will readily appreciate that the policy module is not necessarily associated with the user node and, if desired, it is associated with the proxy node (as depicted for example in FIG. 3).

Whilst the policy described above utilized role assignment module, those versed in the art will readily appreciate that the invention is by no means bound by the utilization of role-based policy.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters or roman symbols used to designate claim steps are provided for convenience only and do not imply any particular order of performing the steps.

The present invention has been described with a certain degree of particularity but those versed in the art will readily appreciate that various alterations and modifications may be carried out without departing from the scope of the following claims:

The invention claimed is:

1. A method for trusting sites in a communication network, comprising:
   receiving at least one input credential to authenticate a site;
   feeding said at least one input credential to an advanced policy to deduce a plurality of verified general-context declarations related to said site in addition to the authentication of said site, wherein if said plurality of verified general-context declarations cannot be deduced,
   receiving at least one additional input credential, and feeding said at least one additional input credential to said advanced policy to deduce a plurality of verified general-context declarations related to said site in addition to the authentication of said site, until a plurality of verified general-context declarations related to said site in addition to the authentication of said site are deduced;
   associating a symbol with each one of said plurality of verified general-context declarations; and
   displaying said symbol in a predefined way that cannot be set by said site,
   wherein said advanced policy is deducing said plurality of verified general-context declarations as a function of at least one existing credential known to said advanced policy, or to said at least one input credential or said at least one additional input credential.

2. The method according to claim 1, wherein said at least one additional input credential is related to said site.

3. The method according to claim 1, wherein said at least one additional input credential is related to an entity known to said advanced policy.

4. The method according to claim 1, wherein said step of receiving said at least one input credential to authenticate said site further comprises applying an SSL authenticating protocol.

5. The method according to claim 1, wherein at least one said symbol is displayed in a trusted pane.

6. The method according to claim 5, wherein said displaying further comprises displaying in a two pane mode at least one original site page in a first pane from among said two panes and said at least one symbol in a trusted pane from among said trusted pane.

7. The method according to claim 1, wherein said general-context declaration that corresponds to one of said symbols being that the site is sex free.

8. The method according to claim 1, wherein said general-context declaration that corresponds to one of said symbols being that the site is violence free.

9. The method according to claim 1, wherein said credential being a certificate or certificate chain.

10. A method according to claim 1, wherein said advanced policy includes a role assignment module.

11. A system for trusting sites in a communication network, the communication network including a plurality of user nodes inter-linked through at least one proxy node to at least one site server, the system comprising:
    at least one user accessing from a user node, through a proxy node to a server site;
    the server site providing to said proxy node, through said communication network, at least one input credential;
    the proxy node feeding said at least one input credential to an advanced policy to deduce a plurality of verified general-context declarations related to said site in addition to the authentication said site, wherein if said plurality of declarations cannot be deduced, the proxy node receiving at least one additional input credential and feeding said at least one additional input credential to said advanced policy until a plurality of verified general-context declarations related to said site in addition to the authentication of said site are deduced;

the proxy node associating a symbol with each one of said plurality of verified general-context declarations; and the proxy node sending the symbol to the user node and the user displaying said symbol in a predefined way that cannot be set by said site, wherein said advanced policy is deducing said plurality of verified general-context declarations as a function of at least one existing credential known to said advanced policy, or to said input credential or said at least one additional input credential.

12. The system according to claim 11, wherein said user node includes a browser.

13. The system according to claim 11, wherein said user node being cellular telephone.

14. The system according to claim 11, wherein said user node being Personal Digital Assistance device.

15. The system according to claim 11, wherein said proxy node is executed on each of said at least one user node, respectively.

16. The system according to claim 11, wherein the proxy node is configured in response to said advanced policy, to collect additional credentials from credential repository.

17. The system according to claim 11, wherein said at least one input credential is related to said site.

18. The method according to claim 11, wherein said at least one additional input credential is related to an entity known to said advanced policy.

19. A computer software product, including a computer-readable medium in which computer program instructions are stored, which instructions, when read by a computer, cause the computer to perform a method for trusting sites in a communication network, comprising:

receiving at least one input credential to authenticate a site;

feeding said at least one input credential to an advanced policy to deduce a plurality of verified general-context declarations related to said site in addition to the authentication of said site, wherein if said plurality of verified general-context declarations cannot be deduced, receiving at least one additional input credential, and feeding said at least one additional input credential to said advanced policy to deduce a plurality of verified general-context declarations related to said site in addition to the authentication of said site, until a plurality of verified general-context declarations related to said site in addition to the authentication of said site are deduced;

associating a symbol with each one of said plurality of verified declarations; and displaying said symbol in a predefined way that cannot be set by said site, wherein said advanced policy is deducing said plurality of verified general-context declarations as a function of at least one existing credential known to said advanced policy, or to said input credential or said at least one additional input credential.

20. The method according to claim 19, wherein at least one of said symbol is displayed in a trusted pane.

* * * * *